United States Patent [19]

Menard

[11] 3,910,625

[45] Oct. 7, 1975

[54] APPARATUS FOR RAISING A MOVABLE COVER OF AN AUTOMOBILE TRUNK

[75] Inventor: Michel Menard, Chaville, France

[73] Assignees: Regie nationale des Usines Renault; Societe dite: Automobiles Peugeot, both of Paris, France

[22] Filed: Feb. 28, 1974

[21] Appl. No.: 446,741

[30] Foreign Application Priority Data
Mar. 20, 1973  France .............................. 73.09957

[52] U.S. Cl. ............... 296/37 R; 242/107 R; 296/76
[51] Int. Cl.² ............................................ B60R 5/00
[58] Field of Search ........... 296/37 R, 76; 180/82 C; 242/107 R, 107 SB; 254/152, 153

[56] References Cited
UNITED STATES PATENTS

| | | | |
|---|---|---|---|
| 1,944,395 | 1/1934 | Bell | 242/107 R |
| 2,959,414 | 11/1960 | Saltz | 242/107 R |
| 3,181,911 | 5/1965 | Peras | 296/37 R |
| 3,506,305 | 4/1970 | Eineman, Jr. et al. | 180/82 C |
| 3,797,603 | 3/1974 | Loomba | 180/82 C |

FOREIGN PATENTS OR APPLICATIONS

| | | | |
|---|---|---|---|
| 1,069,481 | 11/1959 | Germany | 296/37 R |
| 295,870 | 3/1954 | Switzerland | 296/37 R |
| 191,752 | 10/1956 | Austria | 296/37 R |

*Primary Examiner*—Robert J. Spar
*Assistant Examiner*—Donald W. Underwood
*Attorney, Agent, or Firm*—Oblon, Fisher, Spivak, McClelland & Maier

[57] ABSTRACT

An apparatus for raising a movable cover of an automobile trunk having a device tied to the motion of the trunk lid and includes a roller fixed to the inside of the trunk lid by a holder which supports a spool, within which is mounted a tensioning spring for a band being held in position on the spool by a stop and being rolled up on the spool, and having at its free end a clip which fits within a slot on the under side of the rear end of the cover.

6 Claims, 2 Drawing Figures

APPARATUS FOR RAISING A MOVABLE COVER OF AN AUTOMOBILE TRUNK

BACKGROUND OF THE INVENTION

1. Field of the Invention

The present invention relates generally to automobile trunk covers and more particularly to an arrangement for automatically raising a movable cover of an automobile trunk upon opening of the trunk lid.

2. Description of the Prior Art

In the case of automotive vehicles, such as hatchback vehicles, for example, one is frequently led, in order to preserve an appearance of a touring automobile, to create an arrangement to conceal the trunk space between the back of the rear seat and the trunk lid. This arrangement can be either a simple canvas cover or a more rigid shelf, but it must be easily movable to open the entrance to the trunk under the combined action of the user and the trunk lid counterbalances. Currently, such movable covers are actuated by a system connected to the counterbalance assembly or by direct pressure on one or the other of two rods or by a system of crank levers on one or both counterbalances. These are removable covers without any opening mechanism, and therefore they do not move during the opening of the trunk lid.

SUMMARY OF THE INVENTION

Accordingly, it is an object of the present invention to provide an apparatus for automatically raising a movable cover of an automobile trunk upon raising of the trunk lid.

Another object of this invention is to provide an improved apparatus for automatically raising a movable cover of an automobile trunk upon opening the trunk, which will still permit ready removal of the cover if desired.

Still another object of the invention is to provide an improved apparatus for automatically raising a movable cover of an automobile trunk in rapid fashion upon opening the trunk, which is simple in construction and inexpensive to manufacture.

The present invention thereby concerns more particularly an arrangement tying the movement of a trunk cover with that of the lid of the trunk and which thereby also permits rapid opening of the cover.

The foregoing and other objects are attained according to the present invention through a system which is independent of the trunk lid counterbalance. Because of this, the system can easily be built into the frame so as to take up practically no space in the trunk. In a preferred embodiment, a roller is fixed to the inside of the trunk lid by a holder supporting a spool for a band rolled up thereon. The band is secured at one end by a stop to the spool and at its other end has a clip which may be secured to the underside of the cover. A tensioning spring in the roller provides for keeping the band taut. Thereby, upon opening the trunk lid, the movable cover is automatically raised to permit access to the trunk and upon closing the trunk lid, the cover is automatically repositioned.

BRIEF DESCRIPTION OF THE DRAWINGS

These and other objects, features and attendant advantages of the present invention will be more fully appreciated as the same becomes better understood from the following detailed description when considered in connection with the accompanying drawing, in which like reference numerals designate like or corresponding parts throughout the several views, and wherein.

DETAILED DESCRIPTION OF A PREFERRED EMBODIMENT

Figure 1:
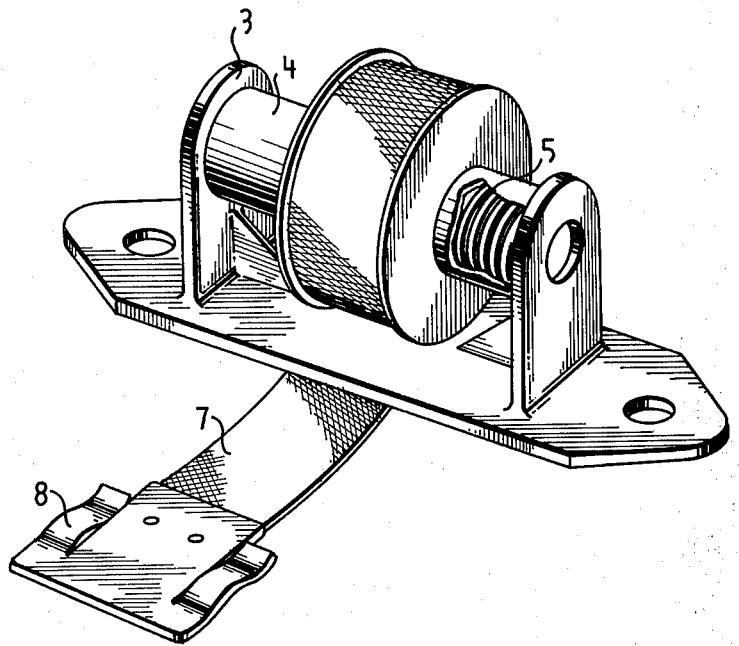
FIG. 1 is a perspective view of a roller, being partly broken away to reveal an interior spring, which according to this invention is attached to the trunk lid.

Referring now to the drawings, and more particularly at the outset to FIG. 1 thereof, there is shown a holder 3 constituted by a flat base portion having apertures at the extreme ends thereof for receiving screws, bolts or the like for securing the part to a firm body member, as will be described, and a pair of upstanding flanges or bosses between which is supported a spool member 4. Installed within the spool 4 is a coil spring 5 being fastened at its one end to the holder 3 and at its other end to the spool 4 in a well known and conventional manner for the purpose of tensioning the spool upon rotation thereof, as will be described in further detail hereinbelow.

A band or belt-like member 7 is wrapped around the spool 4 being held in position by a stop also of conventional design in such spring-wound roll-up devices. This band 7 has a clip 8 at its free end having spring-like fingers on either side of the band securing central part which assist when the clip is fitted into a slot which may be provided for securing the same to a part of the auto body, as will be described. This assembly can be advantageously made of plastic, which would then contribute an appreciable benefit by virtue of its light weight and reduced cost compared to other systems heretofore utilized.

Figure 2:
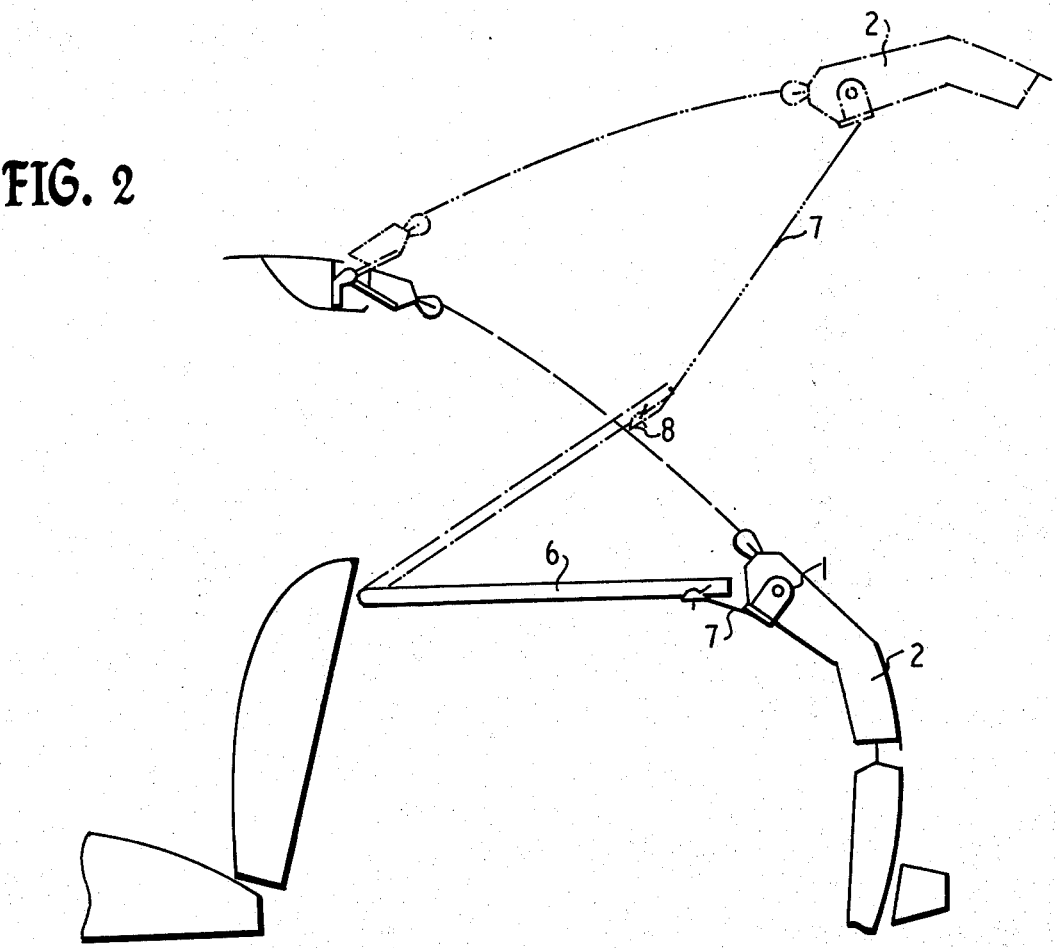
FIG. 2 is a schematic diagram illustrating the operation of the arrangement constituting this invention when a trunk lid in which it is incorporated is opened.

In FIG. 2, it may be seen that the holder 3 is secured to the inside of trunk lid 2 of an automobile, while the clip 8 for the free end of the band 7 being spooled within the holder 3 is engaged within a slot on the underside of a trunk cover member 6 positioned behind the back of the automobile seat for concealing the trunk contents in a fashionable manner. The trunk lid 2 is shown both in the down position, or with the lid being closed, on the one hand, and on the other in its up position, or with the trunk lid being open.

Accordingly, the functioning of the device may be observed to be as follows:

In the trunk lid-closed position, the substantial portion of the length of band 7 is wrapped around the spool 4 and the clip 8 securing the free end of the band 7 is located beneath the cover 6 at the rear end thereof quite near the holder 3. A slight initial tension of the spring 5 allows the band to remain nicely in place and kept somewhat taut.

In the course of the opening movement of the trunk lid 2, the holder 3 being fixed to the lid 2 of the trunk is raised away from the cover 6, thereby causing unrolling of the band 7 from the roller 4, since the free end of the band remains secured to the underside of the cover 6. During this maneuver and until complete unwrapping of the band occurs, the spring 5 becomes stretched.

Once the band is entirely unwrapped and then restrained by its stop within the holder 3, the continued opening movement of the trunk lid 2 then causes the cover 6 to be raised also, as shown in FIG. 2, and this continues until the trunk lid 2 reaches its stop at its fully open position.

During the motion of closing the trunk lid 2, the inverse process takes place, that is, the cover 6 descends to its initial position for covering the trunk contents from view, the spring 5 relaxes, thereby automatically rewrapping the band 7 until complete closure of the trunk lid takes place.

The system being dissociated from the counterbalance, the user can, if he wishes, utilize the roller 4 to operate the cover 6 or he can detach the band 7 and its associated clip 8 from the cover 6, whereby the cover 6 can then be moved by hand or even removed.

In the case of moving the cover by hand, the wrapping of the band 7 on the roller 4 is automatic under the action of spring 5 and is quite rapid, and the device then takes up hardly any space and is conveniently stored on the inside of the trunk lid 2, out of the way and even substantially out of sight.

Obviously numerous modifications and variations of the present invention are possible in light of the above teaching. It is therefore to be understood that within the scope of the appended claims the invention may be practiced otherwise than as specifically described herein.

What is claimed as new and desired to be secured by Letters Patent of the United States is:

1. An apparatus for automatically lifting a movable cover of a trunk of an automotive vehicle comprising:
    a trunk lid covering said trunk of said vehicle;
    a movable cover disposed within said trunk of said vehicle;
    roller means secured to the inside of said trunk lid of said vehicle for supporting a band of predetermined length being wound thereon;
    means for securing a free end of said band wound upon said roller means to said movable cover of said trunk of said vehicle; and
    means for tensioning said band so as to urge rewinding of said band on said roller means following unwinding thereof,
    whereby upon raising said trunk lid of said vehicle and thereby moving said roller means away from said movable cover, said band is caused to unwind from said roller means until payed out a predetermined length, whereupon said movable cover will be lifted by further raising said trunk lid, and upon lowering said trunk lid said band will automatically be rewound upon said roller means by said tensioning means.

2. An apparatus as set forth in claim 1, wherein said roller means comprises:
    a holder adapted to be secured to said trunk lid; and
    a spool rotatably carried by said holder for winding and unwinding said band thereon.

3. An apparatus as set forth in claim 2, wherein said means for tensioning said band is a spring fixed at one end to said holder and at the other end to said spool.

4. An apparatus as set forth in claim 3, further comprising a stop means securing the one end of said band to said spool to limit the unwinding of said band from said spool.

5. An apparatus as set forth in claim 1, wherein said means for securing the free end of said band to said movable cover is a clip secured to said free end of said band and being detachable from said movable cover.

6. An apparatus as set forth in claim 5, wherein said clip is detachably secured to the underside of said movable cover near the rear end thereof.

* * * * *